United States Patent
Reyes et al.

(10) Patent No.: US 6,931,265 B2
(45) Date of Patent: Aug. 16, 2005

(54) WIRELESS MOBILE DEVICE

(75) Inventors: Rene Reyes, Kenner, LA (US); Valerio Varela, Metairie, LA (US); Richard Kraemer, Metairie, LA (US); Pedro Galeas, Kenner, LA (US); Manuel Padilla, Kenner, LA (US)

(73) Assignee: Microsite Technologies, LLC, Kenner, LA (US)

( * ) Notice: Subject to any disclaimer, the term of this patent is extended or adjusted under 35 U.S.C. 154(b) by 412 days.

(21) Appl. No.: 10/154,617

(22) Filed: May 24, 2002

(65) Prior Publication Data

US 2004/0204126 A1 Oct. 14, 2004

(51) Int. Cl.[7] .................................................. H04B 1/38
(52) U.S. Cl. ...................... 455/566; 455/550.1; 455/73; 455/90.1; 345/1.1; 345/173; 379/419; 379/440; 361/681
(58) Field of Search ................................. 455/566, 450, 455/344, 557, 550, 550.1, 73, 90.1; 345/1.1, 173; 379/419–440; 361/681

(56) References Cited

U.S. PATENT DOCUMENTS

| | | | |
|---|---|---|---|
| 6,297,945 B1 * | 10/2001 | Yamamoto | 361/681 |
| 6,311,076 B1 | 10/2001 | Peuhu | |
| 6,573,886 B1 * | 6/2003 | Lehtinen et al. | 345/173 |
| 6,577,496 B1 * | 6/2003 | Gioscia et al. | 361/681 |
| 6,643,124 B1 * | 11/2003 | Wilk | 361/681 |
| 6,744,481 B2 * | 6/2004 | Cheng | 349/113 |
| 2003/0043087 A1 * | 3/2003 | Kim | 345/1.1 |
| 2003/0095374 A1 * | 5/2003 | Richardson | 361/681 |
| 2004/0051944 A1 * | 3/2004 | Stark | 359/448 |

* cited by examiner

Primary Examiner—Sonny Trinh
Assistant Examiner—Khai Nguyen
(74) Attorney, Agent, or Firm—Joseph J. Regard, Ltd PLC

(57) ABSTRACT

A wireless Mobile Executive Assistant (MEA) in the form of a PDA/Phone having multiple, independently oriented screens configured to provide data, video independently or in combined fashion. Formed in the opposing first and second edges adjacent to a body having main display screen formed thereon are first and second slots, respectively, the first and second slots formed to receive first and second, slidingly engaging ancillary display screens. Each of the first and second display screens provide independent video or data information from the MEA, or video or other data transmission via the MEA, and can accordingly be used to conference simultaneously with three independent parties on three separate screens. The first and second screens each slidingly engage from a stored position fully with their respective first and second slots, wherein the screens are not discernable to the observer, and the MEA has the appearance of an ordinary cellular-type phone; alternatively, the first and second screens may emanate so that the phone has a first screen emanating from one side, and a second screen emanating generally from the opposite side of the unit, with the main screen situated therebetween. In addition to independent transmissions, all three screens can be deployed to form a single wide screen transmission.

12 Claims, 6 Drawing Sheets

WIRELESS MOBILE DEVICE

TECHNICAL FIELD OF THE INVENTION

The present invention relates to portable personal digital assistants/communications devices, and in particular to a wireless Mobile Executive Assistant (hereinafter MEA) in the form of a PDA/Phone having multiple, independently oriented screens configured to provide data, video independently or in combined fashion.

The preferred embodiment of the present invention comprises a body having first and second sides and first and second edges, a top, and a bottom, the first side having upper and lower portions, the lower portion having an input device such as a numerical keypad, alphanumeric entry device, or programmable touch screen or the like, the upper portion having a main display screen such as a high resolution color active TFT or other LCD or like screen. Formed in the opposing first and second edges adjacent to said main display screen are first and second slots, respectively, the first and second slots formed to receive first and second, slidingly engaging ancillary display screens.

Each of the first and second display screens is configured provide independent video or data information from the MEA, or video or other data transmission via the MEA, and can accordingly be used to conference simultaneously with three independent parties on three separate screens. The first and second screens each slidingly engage from a stored position fully with their respective first and second slots, wherein the screens are not discernable to the observer, and the MEA has the appearance of an ordinary cellular-type phone; alternatively, the first and second screens may be slidingly deployed to emanate from said first and second slots, respectively, so that the phone has a first screen emanating from one side (for example, the left) of the main screen, and a second screen emanating generally from the opposite side (for example, the right) side of the main screen. In addition to independent transmissions, all three screens can be deployed to form a single wide screen transmission.

BACKGROUND OF THE INVENTION

The prior art has contemplated various personal digital assistants (PDAs), handheld computers, cellular telephones and similar mobile electronic devices, which incorporate a screen and touch pad. A feature common in many units is that the display screen, which may be more fragile than the remaining portion of the body, may be folded over to both protect the screen and conceal/isolate the keyboard/keypad when the unit is not in use. An example of such a unit may be found in, for example, the MOTOROLA STARTAC cellular telephone. Cellular telephones have displays which have are somewhat limited in display capabilities and resolution, as their function has been limited to displaying generally alphanumeric and simple symbols as the data.

Recently, hybrid PDA/Cell phone's have been made available on the marketplace, wherein the functions of a cell phone are incorporated into a PDA. Some may even envision color screens of a resolution higher for displaying graphics or even video streams. However, the footprint of the unit itself has been a limiting factor as to the size of the screen; typically, it is desirable to maintain the body of the device small enough to remain portable and easily carried, thereby limiting the screen size.

U.S. Pat. No. 6,311,076 to Nokia Mobile Phones Ltd contemplates a mobile communications device which includes a body or housing having an elongate slot formed therein for receiving a display in a retracted position, which display may be withdrawn by the user to a position exterior the housing for use by the user. The display in this patent may be flexible and may be wrap about a roller within the body. There are no teachings relating to video streaming or conferencing, and no teaching regarding integrated utilization of multiple screens situated upon or selectively emanating from the housing or body.

GENERAL SUMMARY DISCUSSION OF THE INVENTION

The present invention contemplates an MEA which provides multiple displays which may be utilized separately or in an integrated fashion in real time, which displays store in a relatively small, portable housing or body.

Mobile communications devices and/or PDAs continue to shrink in size, as it is advantageous that the unit be small for portability and ease of handling on a mobile basis. However, a problem associated with the continuous shrinking is that the units are less ergo metrically friendly. For example, keyboards/keypads or other manual entry means has gotten so small that users often have to resort to plucking a miniature keyboard with a stylus, or scribbling on tiny pads so as to allow internal OCR software to attempt to discern the corresponding ASCII character.

Further, the screens are so tiny as to provide only limited data display on a page, and limited functionality in terms of other functions such as games, video streams, etc. Thus, while battery power size has decreased but power increased, and processor capabilities have likewise increased with corresponding decreases in size and power consumption, these miniature computer/communications devices are facing significant limitations due to the traditional designs of the housing, namely, a single screen situated on the housing with associated data input means situated on the same side of the screen.

The present invention seeks to overcome the limitations of screen size in these compact bodies by providing multiple, independent screens which are situated in such a manner as to virtually expand the main screen on the body when desired, so as to provide a larger view of the data/graphic, etc displayed on the main screen, or provide second and third additional screens for simultaneous independent communications, such as video conference calls, independent programs, or separate data displays. When the second and third screens of the preferred embodiment of the present invention are no longer in use, the user simply slidingly urges each said screen into its respective storage slot in the body, resulting in a small footprint and unit which may have an appearance otherwise similar to other units.

It is noted that the displays may be touch sensitive to provide an expanded data entry area, or the user may utilize more traditional keypad, OCR, or voice recognition data input techniques.

It is therefore an object of the present invention to provide a PDA/mobile communication device which provides a small footprint when not in use, but expandable display means on an as needed basis.

It is therefore an object of the present invention to provide an MEA which has a large display, yet is smaller, than prior art devices.

It is still another object of the present invention to provide an MEA which has a main display and first and second ancillary displays which, when deployed, can provide a single, virtually expanded display.

It is still another object of the present invention to provide an MEA which can provide video conferencing on three simultaneous channels, each being displayed upon a separate screen.

It is another object of the present invention to provide an MEA which provides includes a main display, and first and second concealed ancillary displays, which may be deployed to provide, in concert with the main display, an enlarged data entry surface.

Lastly, it is an object of the present invention to provide a method and system for displaying graphics or data, or providing data entry means, utilizing first and second ancillary displays emanating from opposing sides of a main display.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein.

DETAILED DISCUSSION OF THE INVENTION

Referring to FIGS. 1A–1D, and 2A–2D the preferred embodiment of the present invention comprises a main body 1 having front 2 and rear 3 sides and first 4 and second 5 side edges, as well as top 6 and bottom 7 ends, the first side having upper 8 and lower 9 portions, the lower portion having an input device 10 such as a numerical keypad, alphanumeric entry device, or programmable touch screen or the like, the upper portion having a main display screen 11 such as a high resolution color active TFT or other LCD or like screen.

Formed in the opposing first and second edges adjacent to said main display screen are first 12 and second 13 slots, respectively, the first and second slots formed to receive first 14 and second 15, slidingly engaging ancillary display screens (respectively), each display having a housing 16, 16' for protecting same.

The first and second ancillary displays, when not in use, are urged 18, 18' to a stored position 17, 17' fully into their respective first and second slots, wherein the screens are enclosed by the main body and not readily discernable to the observer, wherein the MEA has the appearance of an ordinary cellular-type phone. When used, the first and second screens may be slidingly deployed 19, 19' to emanate from said first and second slots, respectively, so that the first screen emanates from a first 20 side (for example, the left) of the main screen, and a second screen emanates generally from the opposite, second 20' side (for example, the right) side of the main screen.

Each of the first 14 and second 15 ancillary display screens is configured to selectively supplement the main display 11, by displaying video or data information, or video or other data transmission via hardware associated with the MEA, and can accordingly be used to video conference simultaneously with three independent parties on the three separate screens.

As shown, the main body of the unit has situated thereon a camera 21 for uploading the image of the user, who is facing the screens, one of which may contain the image of the party(ies) which the user is addressing during a video-conference. The ancillary screens may also be utilized to project selective images or data, or a whiteboard for use during the teleconference, as deemed necessary by the user.

The preferred embodiment of the MEA of the present invention may include parallel processing capability to provide multiple video/audio/data signal streams, which may be selectively directed to separate displays if desired, and which may be transmitted/received utilizing various known technologies. As with other radio communication devices, an antenna 22 is provided for transmitting/receiving the RF signal.

Continuing with FIGS. 1A–1D, 2A–2D, 3A–3B, and 4A–4B, the first 14 and second 15 ancillary displays are slidingly engaged to their respective slots 12, 13 so that said displays may be urged from their stored position 17, 17' to a deployed 19, 19' position. To provide a stable, controlled deployment and retrieval of the ancillary displays, each slot 12, 13 formed in the housing 1 may have formed therein a track 23, 23' situated in an upper 26 wall 25, 25' forming the slot for receiving a roller 24, 24' which roller diameter engages the respective track 23, 23'.

Figure 1A:
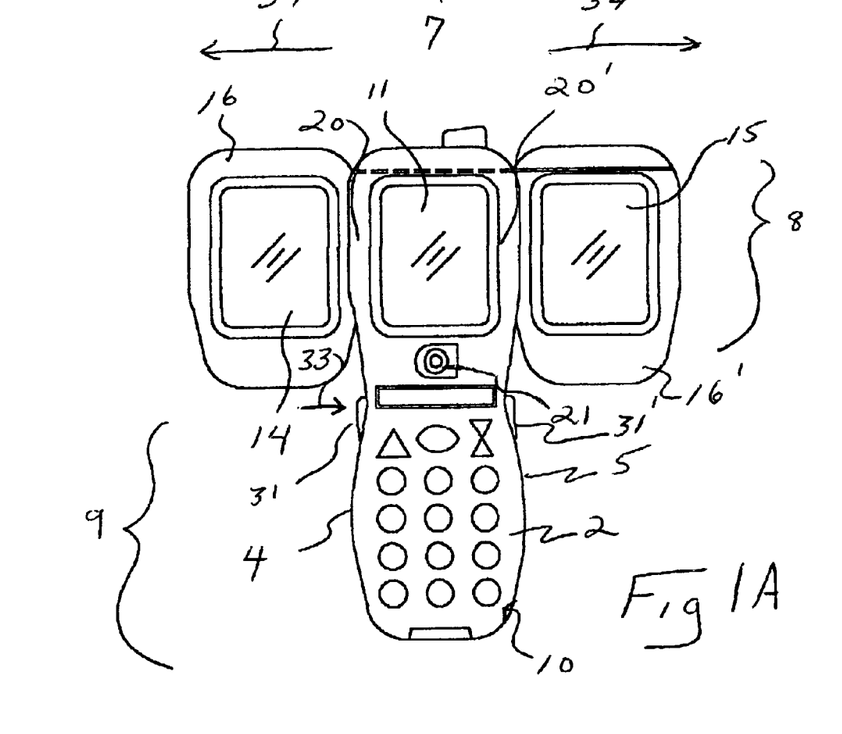
FIG. 1A is a front view of the preferred embodiment of the MEA of the present invention, illustrating the first and second ancillary displays deployed on opposing sides of the main display.
Figure 1B:
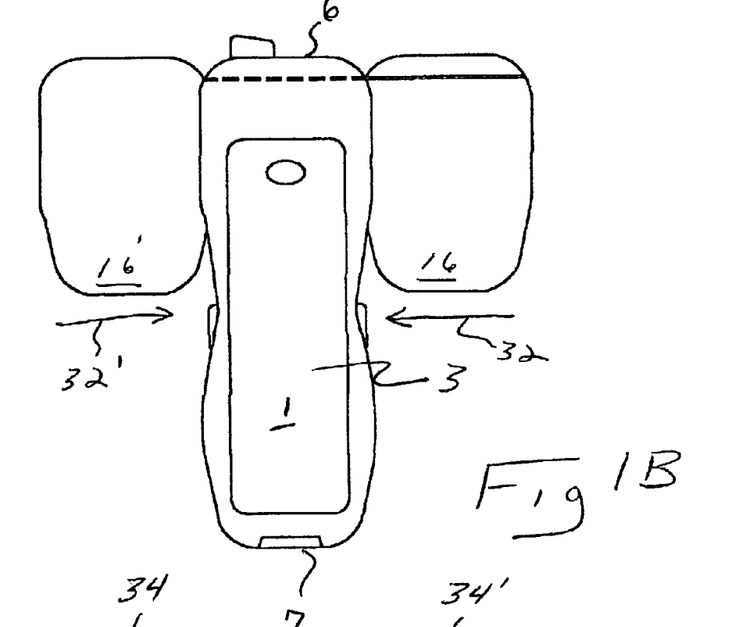
FIG. 1B is a back view of the invention of FIG. 1A.
Figure 1C:
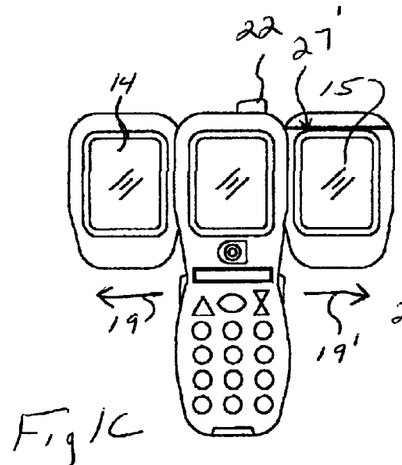
FIG. 1C is a front view of the invention of FIG. 1A, illustrating the top engagement rail situated on the second ancillary display.
Figure 1D:
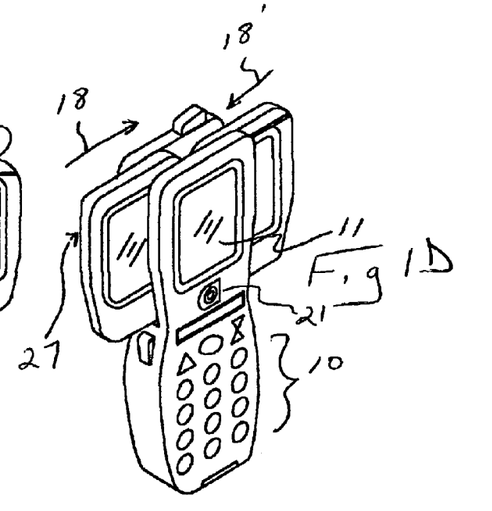
FIG. 1D is an isometric view of the invention of FIG. 1C.
Figure 2A:
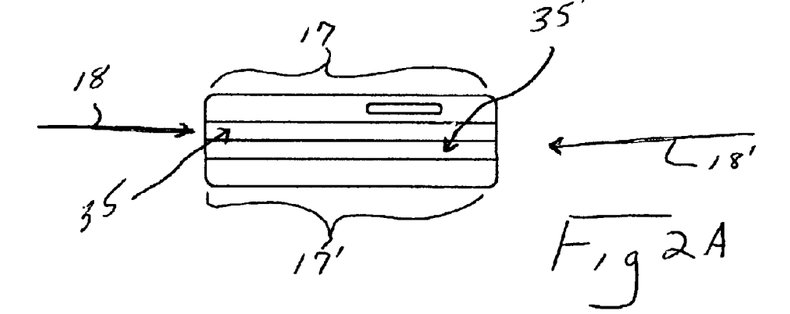
FIG. 2A is a top view of the invention of FIG. 1A, illustrating the first and second ancillary displays in stored configuration within the main housing.
Figure 2B:
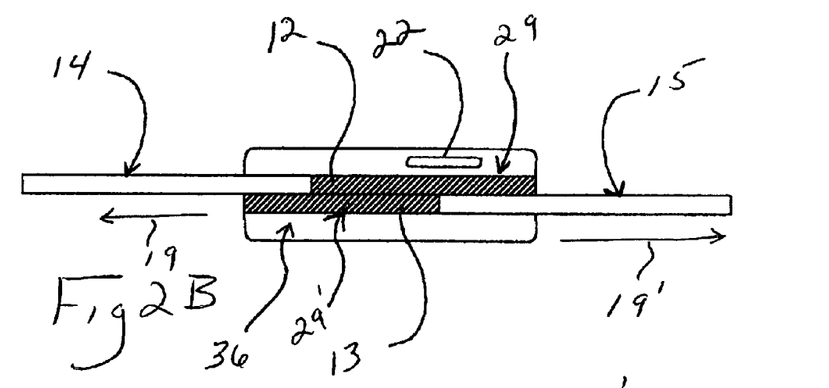
FIG. 2B is a top view of the invention of FIG. 1A, illustrating the first and second ancillary displays in deployed fashion exterior the main housing.
Figure 2C:
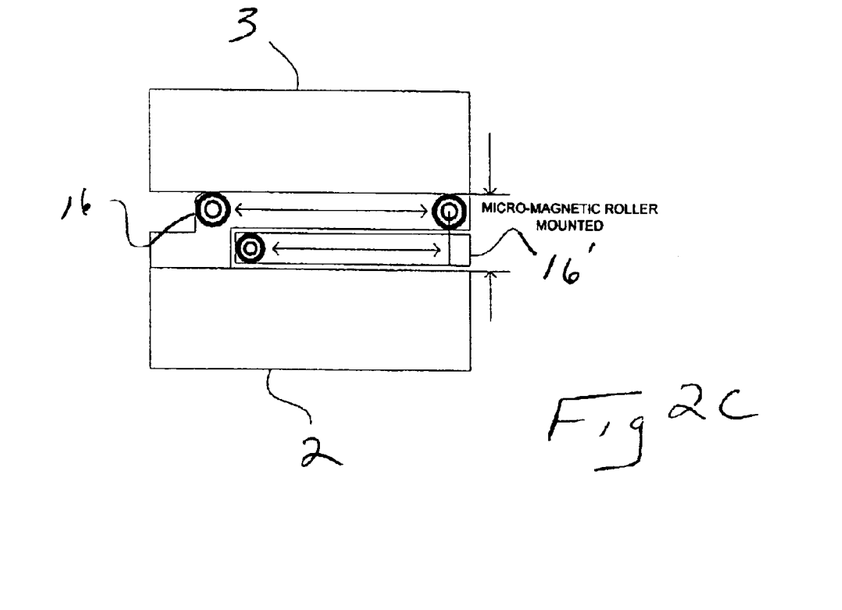
FIG. 2C is a top, partially cut-away, partially cross-sectional view of the rollers utilized in deploying, retracting the first and second ancillary display out of, and back into, the main housing, respectively.
Figure 2D:
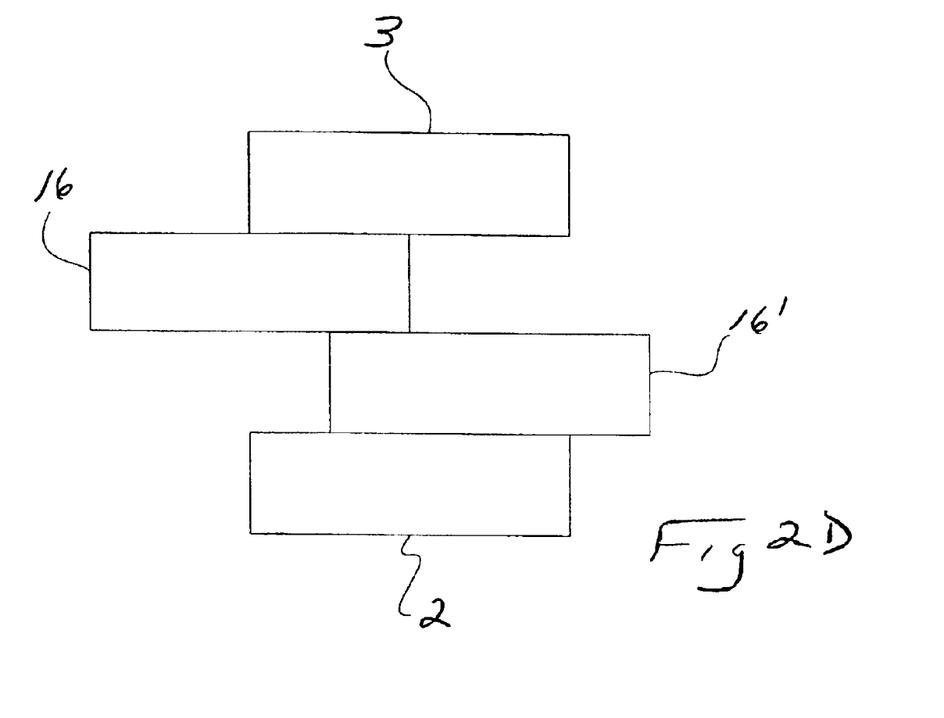
FIG. 2D is a block representation of the position of the main housing and deployed ancillary screens of FIG. 2B.
Figure 3A:
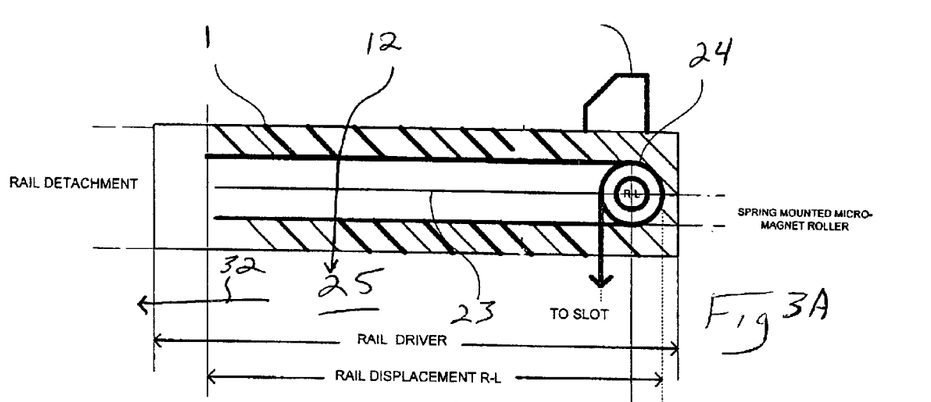
FIG. 3A is a top, partially cross-sectional, partially cut-away view of the invention of FIG. 2C, illustrating the interface of the housing, roller, and rail of the second ancillary display housings.
Figure 3B:
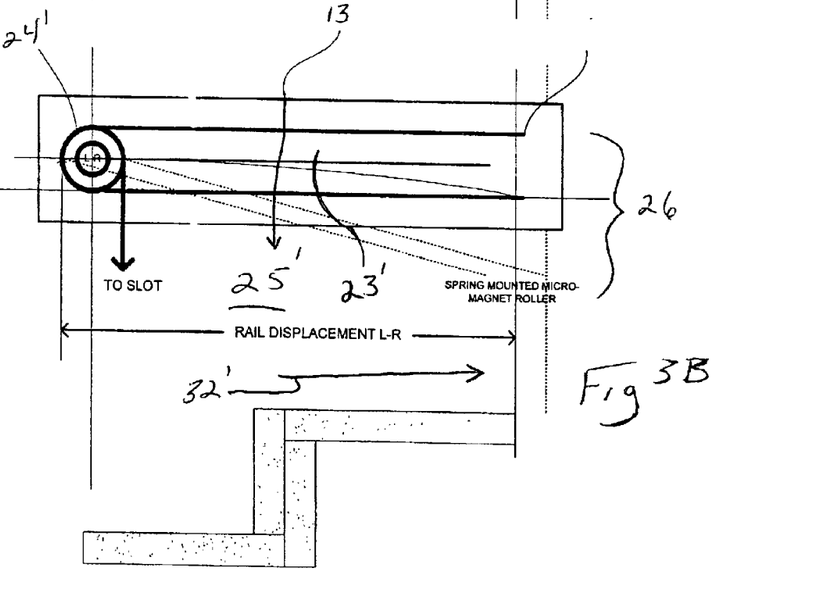
FIG. 3B is a top, partially cross-sectional, partially cut-away view of the invention of FIG. 2C, illustrating the interface of the housing, roller, and rail of the first ancillary display housings.

To accomplish this, roller 24 is affixed to the corresponding back side 27 of display housing 16 situated within first slot 12 via roller shaft 28, while roller 24' affixed to the corresponding front side 27' of display housing 16' situated within second slot 13.

Spring bias 29, 29' or the like may be provided to urge 32, 32' the respective rollers into a deployed position. To retain the ancillary displays in a stored position 17, 17', a locking mechanism 30, 30' may be provided which could be selectively disengaged via internal servo or actuator, or via manual initiation buttons 31, 31' (respectively), which may be pressed 33 so as to disengage the locking mechanism to release the respective ancillary display, wherein the spring bias selectively "pops" 34, 34' one or both of the ancillary screens into their respective deployed positions (depending upon the button(s) pushed).

To return the displays to the stored positioning within the housing, the units are merely urged 32, 32' back into their respective slots in the housing, wherein the locking mechanism engages 35, 35' the respective display housing, retaining same in the stored position until released. Proximity switches 36 may be provided to initiate power to the ancillary displays upon deployment, and cut off power when said displayed are placed in the stored position, to conserve valuable battery power.

It is noted that the present device can be designed for manual deployment of the ancillary display(s) via manual initiation buttons 31, 31' as indicated, but also be automatically deployed when the device is in operation via internal servo or actuator 37. In such a configuration, for example, the actuator 37 can be automatically initiated by the controller circuitry 38 on demand, such as when a second video call is received. In such a scenario, a first video call may be displayed upon the main screen. When the second call is received during the term of the first call, the actuator may be initiated to deploy one of the first or second ancillary screens to display the second caller, wherein the user may engage in a conference call between the first and second callers, as desired.

If a third caller calls in during the term of the call with the first and second callers, the other, unused ancillary display may be deployed, so each video caller is displayed upon a separate screen. The unit may be programmed so that the ancillary screens "pop out" by default as needed, or may be programmed to "pop out" only after authorization is given by the user. Another option would be to provide an audio or other indication of an additional call or other communication, and the user manually "pops out" the desired ancillary display, which displays the data from said additional call or other communication.

Also, it is noted that the ancillary screens can be made to "pop out" during a call not only for video face-to-face communications, but also to serve as a "white board" for scribbling notes, figures, drawings, etc as would be done during a meeting with the other participants (said ancillary screen may have touch screen capability for this purpose), or may be used as an ancillary screen for displaying other data, documents, text, graphics, video, etc which could be used in conjunction with the meeting, or as a separate source of keeping notes on the meeting (which could be private to the user), or other reference or related use.

Figure 4A:
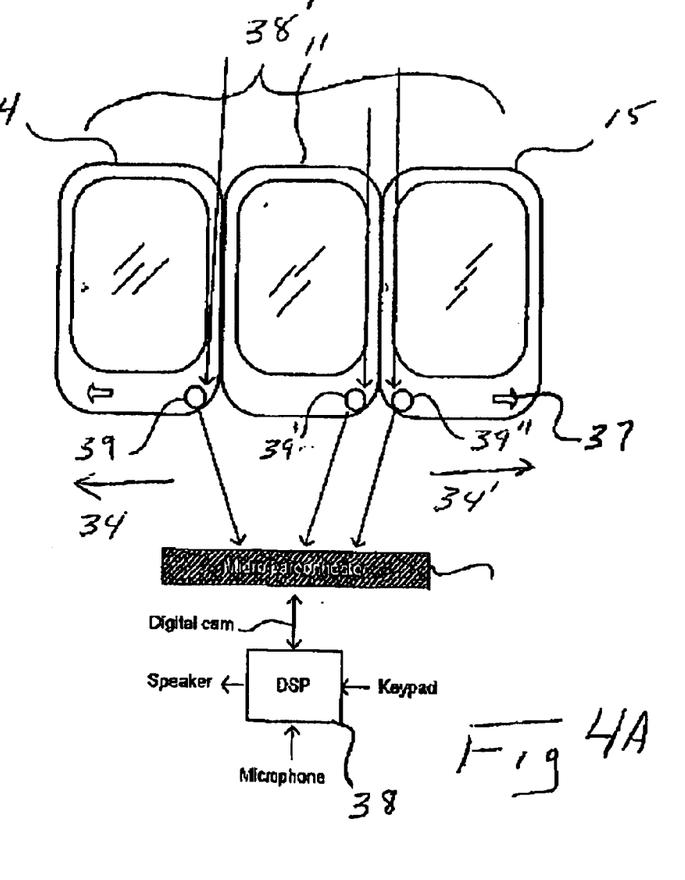
FIG. 4A is a view of the first ancillary display, main display, and second ancillary display, further illustrating by block diagram the micro-bar connection to the displays and the digital signal processor (DSP).
Figure 4B:
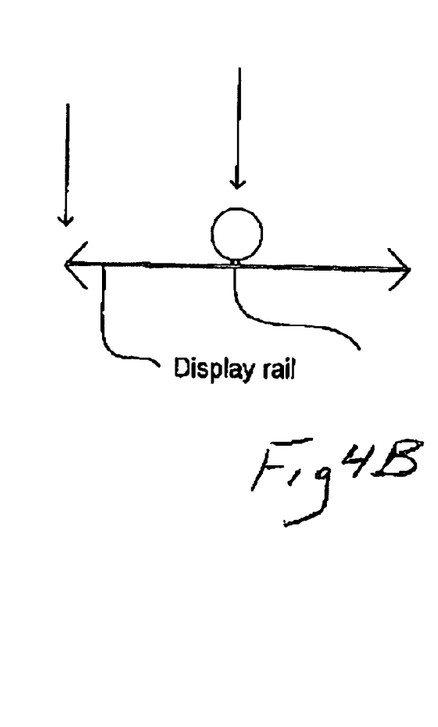
FIG. 4B is a representation of an exemplary roller interface with a display rail associated with one of the ancillary display housings.

Continuing with FIG. 4A, still another use of the combination of the main display 11 having first 20 and second 20' sides and the first 14 and second 15 ancillary screens being able to, in essence, "pop out" 34, 34' from behind said first and second sides is that, as they are side-by-side when deployed, the displays can be made to work in concert to provide a single panoramic image 38' or video or other display, such as a video conference of multiple parties at a single location, or a video of a movie or other entertainment or other use, as opposed to three separate displays.

Accordingly, the present unit may be used to receive a video stream of a news broadcast, video conference, data projection such as an EXCEL or POWERPOINT document, or other data display on a single screen constructed from the main screen and first and second, deployed ancillary screens working in concert. In this fashion, the present invention provides a compact, pocket sized communications/PDA device which can quickly and easily provide enhanced, larger displays than has been able to be provided in such compact packages in the past. Also, if the screens or displays are touch sensitive, they can be deployed to provide a single, enlarged touch sensitive input interface, such as a touch sensitive keyboard.

The screens can each have their own separate power switch 39, 39', 39" for manually turning on/turning off same as desired. Because the first and second ancillary screens may be manipulated from a stored position to a deployed position, an appropriate connection such as ribbon wire or micro bar connector 40 should be provided to insure reliable data transfer.

A listing of the elements of the invention follows:

Description
1 main body
2 front side
3 rear side
4 first side edge
5 second side edge
6 top end
7 bottom end
8 upper portion
9 lower portion
10 input device
11 main display screen
12 first slot
13 second slot
14 first ancillary display
15 second ancillary display
16 housing
17,' stored position
18,' urged in
19,' deployed
20 first, second sides of main display
21 camera
22 antenna
23 track
24 roller
25 sidewall of slot
26 upper portion of sidewall
27 backside of ancillary display housing
28 shaft
29 spring bias
30 locking mechanisms
31 manual initiation buttons
32 urge
33 pressed
34 pops
35 engages
36 proximity switches
37 actuator
38 controller circuitry
39 power switches
40 micro bar connector The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. A mobile executive assistant for a user, comprising:
a body having first and second sides and first and second edges, a top, and a bottom, said first side having a main display screen, said body having a first slot formed in said first edge of said body in the vicinity of said main display screen, said body having a second slot formed in said second edge of said body in the vicinity of said main display screen;

a first ancillary display slidingly engaged to said first slot;

a second ancillary display slidingly engaged to said second slot;

bias means for selectively providing bias to said first and second ancillary displays;

an actuator for selectively initiating said bias means so as to selectively urge said first and second ancillary displays from a first, stored position within said respective first and second slots, wherein said screens are not discernable to the user, to a second, deployed position wherein said first screen emanates from said first edge of said body adjacent to a first side of said main display screen, and said second screen emanates from said second edge of said body adjacent to said second side of said main display screen;

controller circuitry automatically controlling said actuator, said controller circuitry interfacing with the operation of the mobile executive assistant.

2. The mobile executive assistant of claim 1, wherein said main display, and flanking first and second ancillary displays in said deployed position display substantially separate portions of a single image which, when simultaneously viewed on said main display and said first and second ancillary screens, provides a view of said single image.

3. The mobile executive assistant or claim 1, wherein said first and second ancillary displays are automatically deployed by said actuator by said controller circuitry from the main body to display video, graphics, or data.

4. The mobile executive assistant of claim 3, wherein said main display and said first and second ancillary displays are touch sensitive, and can be used for data input.

5. A mobile executive assistant for a user, comprising:

a body having first and second sides and first and second edges, a top, and a bottom, said first side having a main display screen, said body having a first slot formed in said first edge of said body in the vicinity of said main display screen;

a first ancillary display slidingly engaged to said first slot;

bias means selectively providing bias to said first ancillary display;

an actuator for selectively initiating said bias means so as to selectively urge said first ancillary display from a first, stored position within said first slot, wherein said first ancillary screen is not discernable to the user, to a second, deployed position wherein said first ancillary screen emanates from said first edge of said body adjacent to a first side of said main display screen;

controller circuitry for automatically controlling said actuator, said controller circuitry interfacing with the operation of the mobile executive assistant.

6. The mobile executive assistant of claim 1, wherein said main display, and flanking first ancillary display in said deployed position displays substantially separate portions of a single image which, when simultaneously viewed on said main display and said first ancillary screens, provides a view of said single image.

7. The mobile executive assistant of claim 5, wherein said first ancillary display is automatically deployed by said actuator by said controller circuitry from the main body to display video, graphics, or data.

8. The mobile executive assistant of claim 3, wherein said main display and said first ancillary displays are touch sensitive, and can be used for data input.

9. The method of providing an enhanced display capability in a hand held device, comprising the steps of:

a. providing a body forming the housing of said device, said body having first and second sides first and second edges, a top, and a bottom, said first side having a main display screen, said body having a first slot formed in said first edge of said body in the vicinity of said main display screen:

a first ancillary display slidingly engaged to said first slot;

bias means for selectively providing bias to said first ancillary display;

an actuator for selectively initiating said bias means so as to selectively urge said first ancillary display from a first, stored position within said first slot, wherein said first ancillary screen is not discernable to the user and said device is of a reduced size, to a second, deployed position wherein said first ancillary screen emanates from said first edge of said body adjacent to a first side of said main display screen;

controller circuitry for automatically controlling said actuator, said controller circuitry interfacing with the operation of the hand held device;

b. storing said device with said ancillary display in said first, stored position;

c. when viewing an image on said main display, to increase the perceived size of the display image shown on said main display, sensing the operation of said device via said controller circuitry, and upon the occurrence of a predetermined condition, said controller circuit causing said actuator to initiate said bias means, deploying said ancillary display from said stored position to said deployed position so that said display is situated adjacent to, and substantially flanks said main display; and d. altering said image viewed on said main display such that a first portion of said image is displayed on said ancillary display, and a second portion of said image is displayed on said main display, such that when the user views said first ancillary display and said main display simultaneously, the user perceives a single, enlarged, generally complete image.

10. The method of claim 9, wherein said image is a video screen.

11. The method of claim 9, wherein said first ancillary display and said main display are touch sensitive, and said deployed ancillary display and adjacent main display are used in concert to form an enlarged input device.

12. The method of claim 11, wherein said enlarged input device is a keyboard.

* * * * *